C. H. SHOTWELL.
CAR MOVER.
APPLICATION FILED MAY 8, 1908.
902,336.
Patented Oct. 27, 1908.
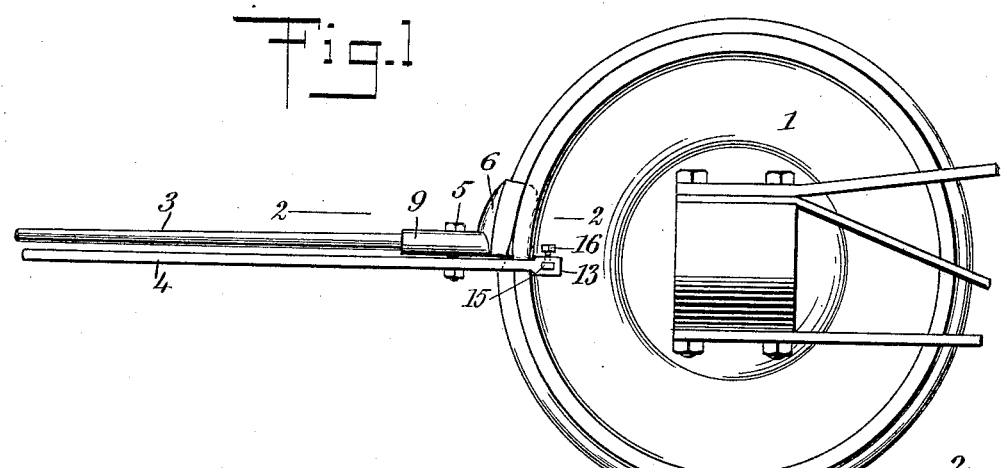
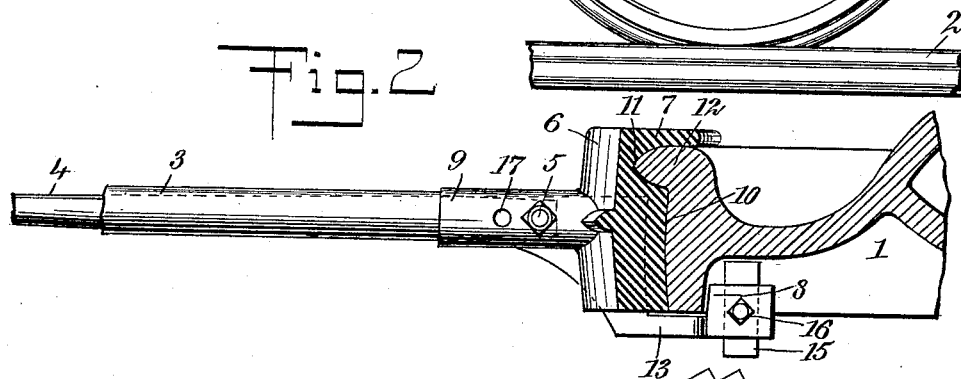
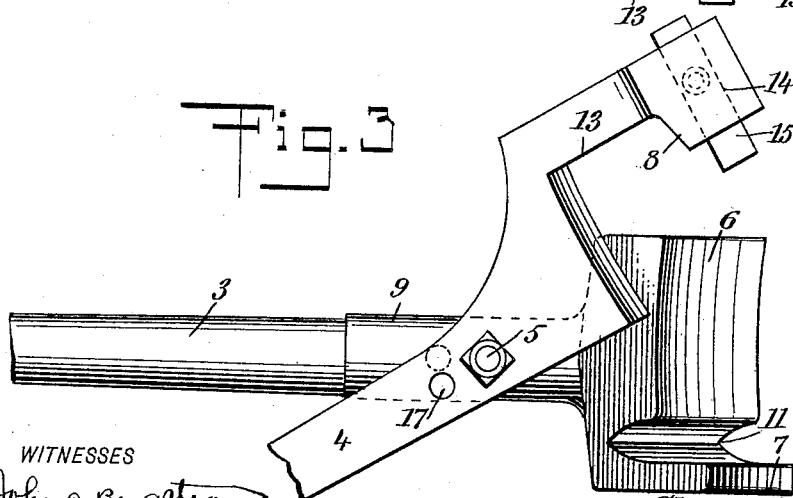
WITNESSES
INVENTOR
Charles H. Shotwell
BY
ATTORNEYS

UNITED STATES PATENT OFFICE.

CHARLES H. SHOTWELL, OF AKRON, OHIO.

CAR-MOVER.

No. 902,336.　　　Specification of Letters Patent.　　　Patented Oct. 27, 1908.

Application filed May 8, 1908.　Serial No. 431,571.

*To all whom it may concern:*

Be it known that I, CHARLES H. SHOTWELL, a citizen of the United States, and a resident of Akron, in the county of Summit and State of Ohio, have invented a new and Improved Car-Mover, of which the following is a full, clear, and exact description.

My invention relates to car movers, and has for its object to provide a lever composed of two members which are pivoted together, the fulcrum being adapted to be adjusted in operative position after the load arm has been disposed against a car wheel, the load arm which serves as a shoe, having a surface which is adapted to conform with the configuration of the tread of the car wheel. By this construction a car mover is provided which can be adjusted to a car wheel by opening and closing the pivoted members, and one which, when once in position, can be slipped along the periphery of a car wheel until it is in a proper position, when the power may be applied at the end of the power arm, by which action the car mover is locked to the car wheel, and as the wheel turns under the movement of the car mover secured thereto, the car is propelled.

Still other objects of the invention will be set forth in the following more complete description of the invention.

In this specification I will describe my preferred form of the invention, but I do not limit myself thereto, as I consider myself entitled to all forms and embodiments which may be held to fall within the scope of the appended claims.

Reference is to be had to the accompanying drawings forming a part of this specification, in which similar characters of reference indicate corresponding parts in all the figures, in which Figure 1 is a side elevation of a car wheel with my car mover applied thereto; Fig. 2 is an enlarged plan view of my car mover with the tread of a car wheel, partly in section on the line 2—2 of Fig. 1, to show the relationship of my car mover to a car wheel; and Fig. 3 is an enlarged perspective view of my car mover.

By referring to the drawings, it will be seen that the car mover is used to rotate an ordinary car wheel 1, which is mounted in the usual manner and travels on a track 2. The car mover is composed of two members 3 and 4, which are pivoted together as shown at 5, on which are formed a shoe 6, a flange 7, and a lip 8 forming a fulcrum. The upper member 3 is preferably constructed of wood, and is inserted in a socket 9, which may be made integral with the shoe 6. This shoe is adapted to conform with the configuration of the tread 10 of the car wheel 1, and it has a groove 11 in which the flange 12 of the car wheel may travel, and the flange 7 is adapted to be disposed against one side of the wheel. The lower member 4, which as stated, is pivoted to the members 3 and 5, has a jaw 13, adapted to conform with the side of the car wheel opposite the flange 12, this jaw 13 having a rectangular transverse opening 14 near its outer terminal, and in this opening is disposed an elongated block 15, held relatively to the jaw 13 by means of a thumb-screw 16, which meshes with a screw thread in the jaw 13, permitting the thumb-screw 16 to engage the elongated block 15, to hold it securely. As shown in Figs. 2 and 3, a series of orifices 17 are provided in the members 3 and 4 and the socket 9, by means of which the members 3 and 4 may be pivoted at different points to enable the flange 7 and the jaw 13 to straddle all forms of car wheels.

In using my invention, the members 3 and 4 are separated so that the flange 7 is at some distance from the jaw 13 and the car mover is then adjusted to the tread of the car wheel with the flange 12 of the car wheel in the groove 11, and the flange 7 against the car wheel flange 12, and the members 3 and 4 are then drawn together, which brings the jaw 13 close against the opposite side of the car wheel with the elongated block 15, and the lip 8 forming the fulcrum of the car mover. With the car mover in this position, with the shoe 6 disposed upwardly, it is possible to slightly depress the members 3 and 4 and push the shoe to any desired position on the tread of the car wheel 1, and when this position has been obtained, by an upward pressure on the members 3 and 4, the lip 8, forming the fulcrum, engages on the inner side of the car wheel tread, while the shoe 6 firmly engages the outside of the car wheel tread, and when the upward pressure is continued on the members 3 and 4, the car wheel 1 is caused to rotate and by this means the car is moved. In adjusting the jaw 13, should it be found that the elongated block 15 is too long or too short with reference to the car wheel 1, the thumb-screw 16 is unscrewed and the elongated block 15 is adjusted to conform with the car wheel. While all car wheels are substantially uniform, they often vary a fraction of an inch across the tread, and for this reason I provide the elongated block 15, to permit of an adjustment with reference to a particular wheel, so that the members 3 and 4 will be close together when the car mover is in position for use.

Having thus described my invention, I claim as new and desire to secure by Letters Patent.

1. A car mover composed of two members pivoted one over the other, means on one of the said members which are adapted to engage with the inner side of a car wheel to form a fulcrum, and a shoe on the other member which is disposed vertically of the members.

2. A car mover composed of two members pivoted one over the other, means on one of the said members which are adapted to engage with the inner side of a car wheel to form a fulcrum, a flange on the other arm, and a shoe secured to one of the arms.

3. In a car mover, a member, a shoe and a flange secured thereto, the shoe being adapted to engage the tread of a car wheel and the flange being adapted to engage one side of the wheel, and another member which is pivoted to the first member and which is adapted to engage the opposite side of the wheel and thus clamp the car mover thereto.

4. In a car mover, a member, a shoe and a flange on the member, there being a groove in the shoe for the flange of the wheel and the shoe conforming in other respects to the wheel tread, and another member pivoted to the first member, the second member having means which together with the flange on the first member are adapted to clamp a car wheel.

5. In a car mover, a member having an arm, a shoe and a flange, the flange being adapted to fit against one side of a car wheel, the shoe conforming in configuration with the tread of the car wheel, and another member pivoted to the first member, the said other member having an arm and means which are adapted to fit against the other side of the car wheel and thus clamp it.

6. In a car mover, a member having an arm, a shoe and a flange, the flange being adapted to fit against one side of the car wheel, the shoe conforming in configuration with the tread of the car wheel, another member pivoted to the first member, the said other member having an arm and means which are adapted to fit against the other side of the car wheel, and means to adjust the relative positions of the flange and the said means which are adapted to fit against the side of the car wheel when moving the said arms relatively to each other.

7. In a car mover, a member having a shoe which is adapted to engage the tread of a wheel, another member, one of the said members having a flange, the other member having a jaw, the members being pivoted together by which means the flange and the jaw are adapted to clamp a car wheel, and means in connection with the jaw by which the car mover may be adjusted to different types of car wheels.

8. In a car mover, a member, a shoe, an arm and a flange on the said member, the shoe conforming in configuration with the tread of the car wheel, and another member pivoted to the first member, the second member having means which together with the flange are adapted to grasp the car wheel and act as a fulcrum for the lever formed of the shoe and the arm.

9. In a car mover, a member, a shoe, an arm and a flange on the said member, the shoe conforming in configuration with the tread of the car wheel, another member pivoted to the first member, the second member having means which together with the flange are adapted to grasp the car wheel and act as a fulcrum for the lever formed of the shoe and the arm, and means in one of the members to assist in adapting the car mover to different types of car wheels.

In testimony whereof I have signed my name to this specification in the presence of two subscribing witnesses.

CHARLES H. SHOTWELL.

Witnesses:
 CORNELIUS H. SPRIGGEL,
 CLARK W. CHERRY.